Nov. 11, 1941.   H. F. WATERS   2,262,479
PROCESS FOR MAKING PHOTOGRAPHIC FILMS
Filed June 3, 1937
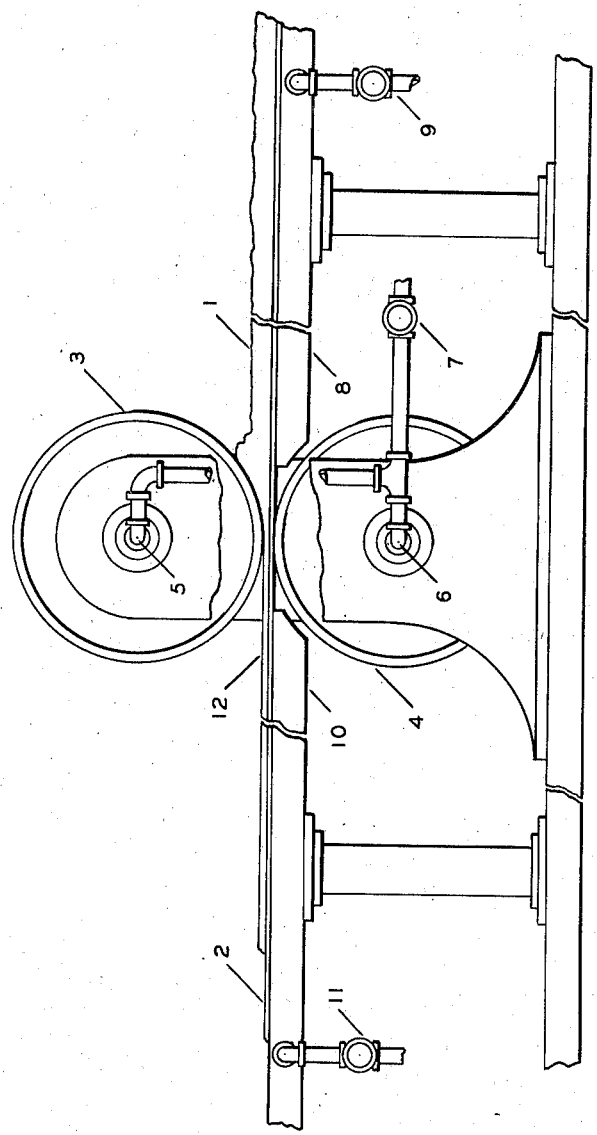
Harry F. Waters
INVENTOR.

Patented Nov. 11, 1941

2,262,479

UNITED STATES PATENT OFFICE 2,262,479

PROCESS FOR MAKING PHOTOGRAPHIC FILMS

Harry F. Waters, New York, N. Y.

Application June 3, 1937, Serial No. 146,129

2 Claims. (Cl. 18—57)

This invention relates to a process for making photographic films by means of calendering a thermo-plastic material such as rubber hydrochloride, Vinylite, Koroseal, Plioform, etc. As those skilled in the art know, Vinylite is a trade name designating a polymerization product of a vinyl halide, particularly vinyl chloride; Koroseal and Plioform are trade names designating rubber hydrochloride products. The object of the invention is to furnish a simple and inexpensive means of forming a thin transparent film, smooth on both sides and adapted to carry a photographic emulsion through the various chemical solutions and/or other processes ordinarily used. Another object is to permit the economical employment of materials not now generally used for photographic purposes.

The method of forming photographic films heretofore has been to dissolve various substances such as cellulose nitrate, cellulose acetate, etc. in a solvent and cast a film by running the liquid on to a cylinder or moving belt where it flows out and forms a thin sheet. The economical operation of this method requires rather elaborate apparatus for the recovery of the solvents.

By the method, I propose, a comparatively thick and roughly surfaced mass of thermoplastic material is passed between heated rollers which form it into a smooth thin film adapted for photographic purposes.

The accompanying drawing shows a side elevation of a machine for the operation of my process. 1 is a mass of thermoplastic material comparatively thick and roughly surfaced. This material is carried on the smooth surfaced belt 2 which passes it between the driven rollers 3 and 4. These rollers calender the thermoplastic mass and form it into a thin smoothly surfaced film at 12. The rollers 3 and 4 are heated by steam or other suitable means supplied to the rollers at 5 and 6, through the valve controlled supply pipe 7. This valve may be used to regulate the temperature of the rollers. The belt 2 rides in close contact with a heating table 8 on the supply side. The supply of steam, or other heating element, and consequently the temperature of the heating table is controlled by a valve shown at 9. It will be noted that the length of this heating table 8 in contact with the belt 2, may be varied so that the length of time that the thermo-plastic is in contact with the heating element as well as the temperature of the heating element, is adjustable. 10 represents a cooling table over which the belt 2 runs after having passed through the calendering rollers. The supply of cooling water to this table is controlled by the valve 11. This cooling action on the belt will cause the film 12 to separate itself from the belt, leaving a thin film, smooth on both sides and adapted for use for photographic purposes.

It will be noted, that my process may be used in a number of steps, that is, the film may be passed successively between a number of calendering rollers and that other means of heating and cooling the film before and after passing through the rollers may be employed.

Having thus described my invention, I claim:

1. The continuous process of forming self-sustaining and flexible thin films smooth on both sides and adapted for photographic purposes from transparent thermoplastic material which comprises establishing a body of thermoplastic material having substantially uneven thickness and surface formation upon a smooth and flexible endless transporting surface, passing said transporting surface in contact with a stationary and plane heating surface to preheat said material to plasticizing temperatures, hot-rolling said preheated material on said transporting surface between smooth and heated cylindrical surfaces to cause formation of a film of reduced thickness and smooth on both sides, passing said transporting surface in contact with a stationary and plane cooling surface to cool the film thus formed below the plasticizing temperature and thereby to continuously separate said film from said transporting surface, and maintaining said flexible transporting surface and the thermoplastic material thereon in a single and substantially horizontal plane at least during said preheating, hot-rolling and cooling operations to obtain a film of uniform thickness and smoothness.

2. The continuous process of forming self-sustaining and flexible thin films smooth on both sides and adapted for photographic purposes from transparent thermoplastic material which comprises establishing a body of thermoplastic material having substantially uneven thickness and surface formation upon a smooth and flexible endless transporting belt, passing said belt in contact with a stationary and plane heating surface to preheat said material to plasticizing temperatures, hot-rolling said preheated material on said belt between smooth and heated rollers to cause formation of a film of reduced thickness and smooth on both sides, passing said belt in contact with a stationary and plane cooling surface to cool the film thus formed below the plasticizing temperature, maintaining said flexible belt and the thermoplastic material thereon in a single and substantially horizontal plane at least during said preheating, hot rolling and cooling operations to obtain a film of uniform thickness and smoothness, and subsequently continuously stripping said film from said belt.

HARRY F. WATERS.